United States Patent [19]
Fielding

[11] Patent Number: 5,188,262
[45] Date of Patent: Feb. 23, 1993

[54] APPARATUS FOR DISPENSING MOIST POWDER MATERIALS

[75] Inventor: Randy L. Fielding, Fremont, Ohio

[73] Assignee: Christy Machine Company, Fremont, Ohio

[21] Appl. No.: 693,325

[22] Filed: Apr. 29, 1991

[51] Int. Cl.⁵ ..................... A45D 24/22; B65D 83/00
[52] U.S. Cl. .................................. 222/185; 222/235; 222/565; 222/482; 222/189; 222/201
[58] Field of Search ............... 222/162, 189, 190, 196, 222/201, 202, 203, 410, 565, 235, 482, 185

[56] References Cited

U.S. PATENT DOCUMENTS

| | | | |
|---|---|---|---|
| 973,359 | 10/1910 | Lima | 222/201 X |
| 1,519,960 | 12/1924 | Day | 222/482 X |
| 1,814,488 | 7/1931 | Murnahan | 222/201 X |
| 2,689,597 | 9/1954 | Kinnear | 222/202 X |
| 2,938,652 | 5/1960 | Polzin | 222/410 |
| 3,070,264 | 9/1961 | Christy | 222/227 |
| 3,463,360 | 8/1969 | Dorfman | 222/482 X |
| 3,556,352 | 1/1971 | Roberts | 222/203 |
| 3,788,529 | 1/1974 | Christy | 222/314 |
| 4,371,101 | 2/1983 | Cane et al. | 222/189 X |
| 4,381,842 | 5/1983 | Heck | 222/189 X |
| 4,498,635 | 2/1985 | Fielding | 222/200 X |
| 4,595,128 | 6/1986 | Fielding | 222/252 |
| 4,595,277 | 6/1986 | Maczuszenko et al. | 222/202 X |
| 5,054,934 | 10/1991 | Kintz | 222/189 X |

Primary Examiner—Andres Kashnikow
Assistant Examiner—Kenneth DeRosa
Attorney, Agent, or Firm—Renner, Otto, Boisselle & Sklar

[57] ABSTRACT

Material dispensing apparatus includes an elongate hopper having a flexible apertured bottom, and an agitator bar mounted for rotation within the hopper having a plurality of circumferentially spaced longitudinally extending rods supported on a rotating stabilizer shaft for material dispensing contact with the apertured bottom. The contact between the longitudinally extending rods and the flexible apertured bottom moves the bottom of the hopper in both an up-and-down and side-to-side direction such that the holes in the bottom change shape and material contained within the hopper is both vibrated and pushed through the apertures in the bottom of the hopper onto a product underlying the hopper. The apparatus is designed to dispense moist pre-sized powder-like materials that tend to agglomerate and adhere together.

18 Claims, 5 Drawing Sheets

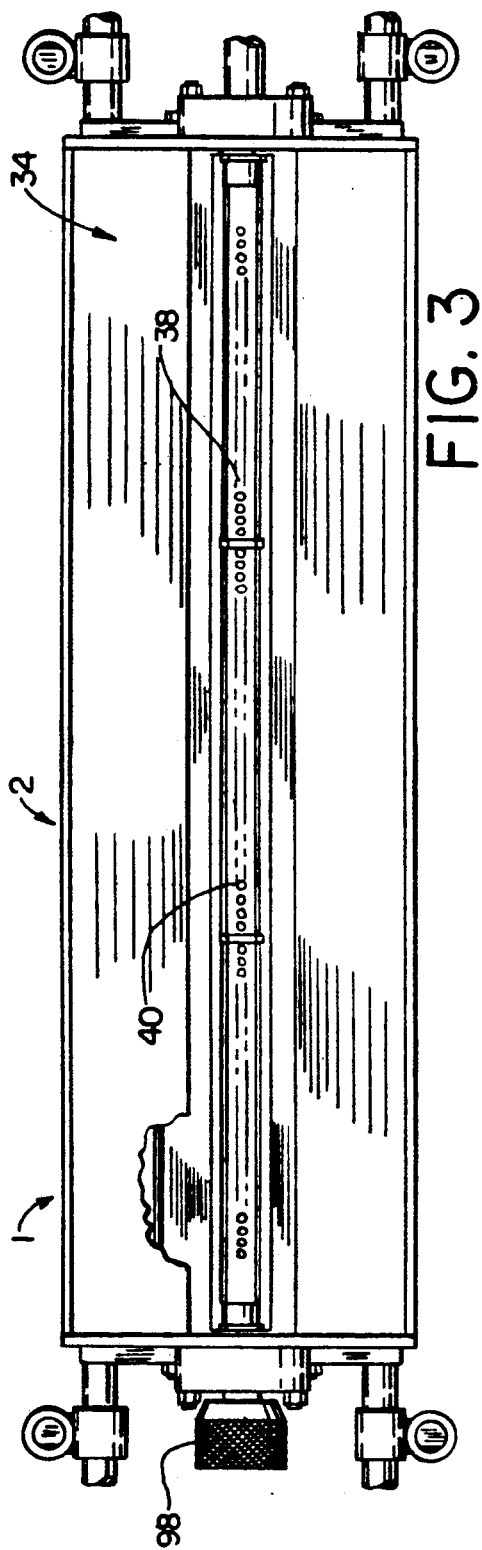
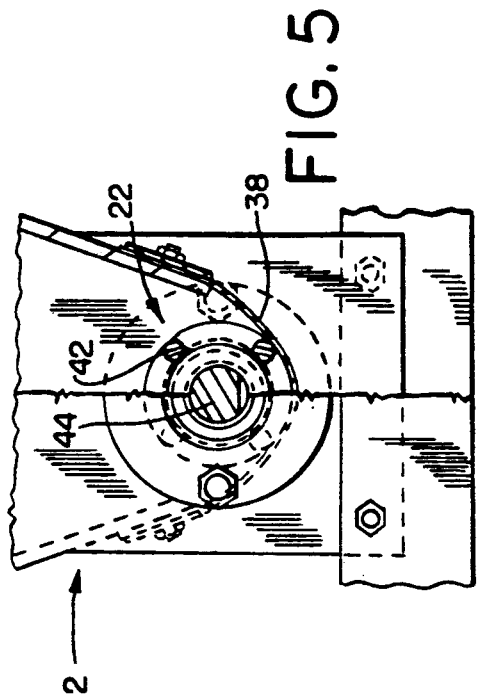
FIG. 5
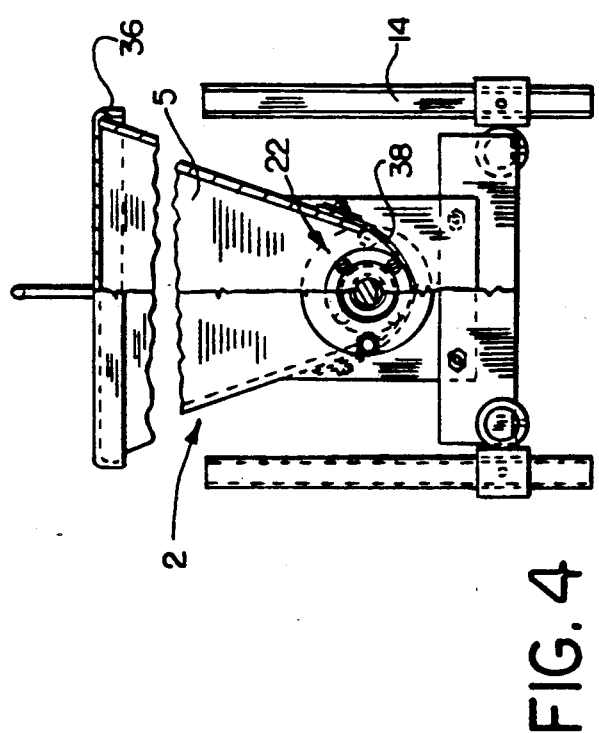
FIG. 4
FIG. 3

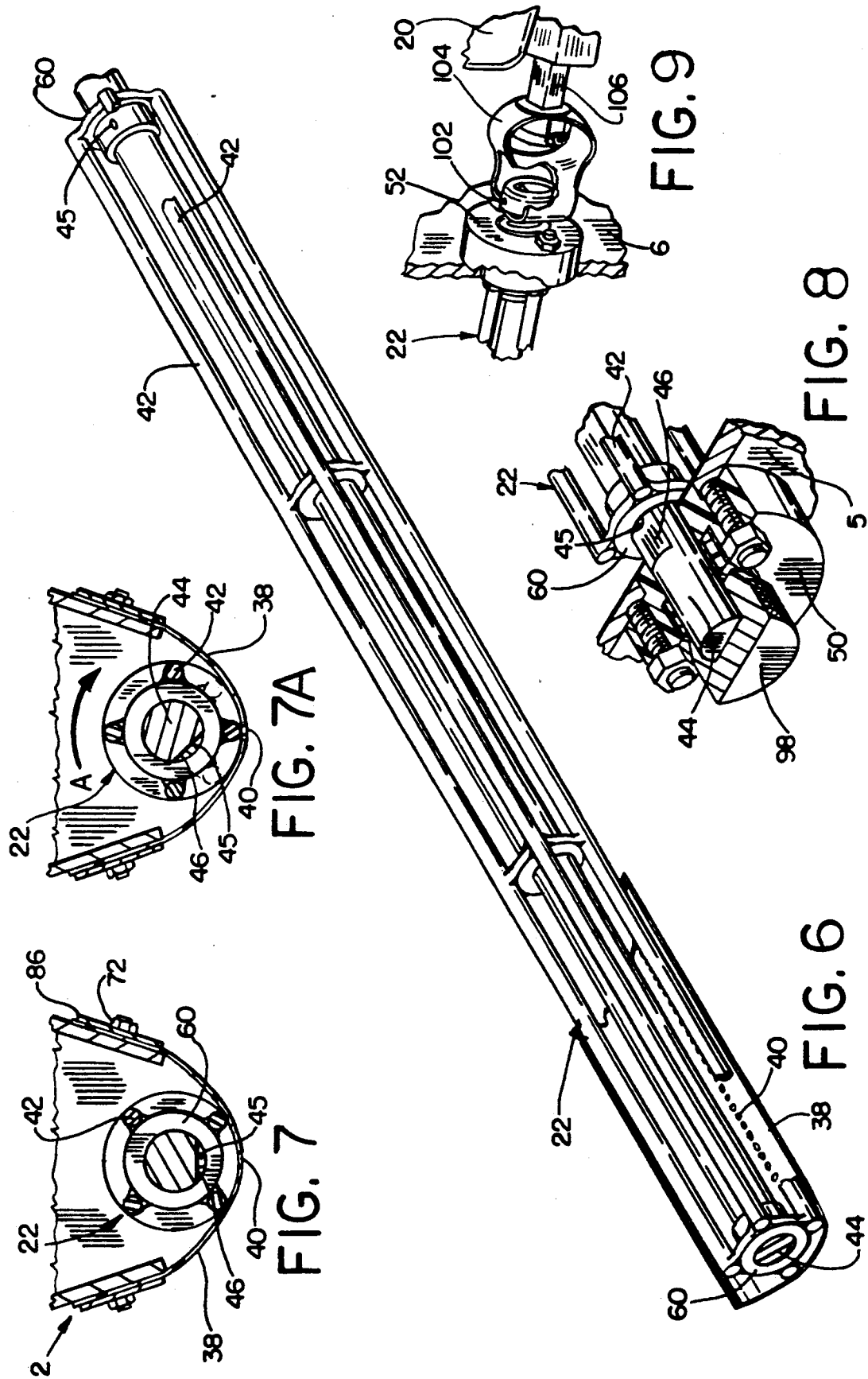

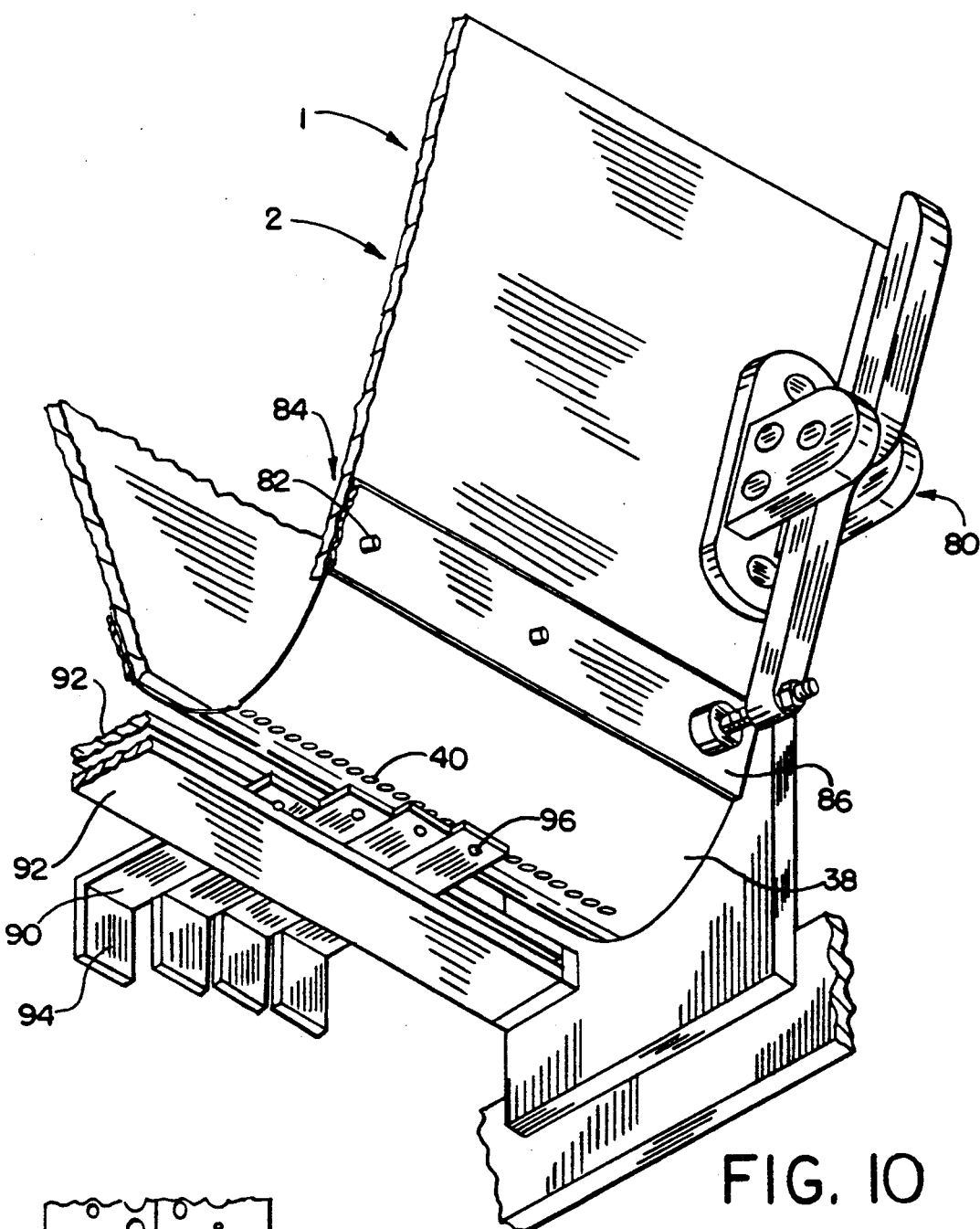
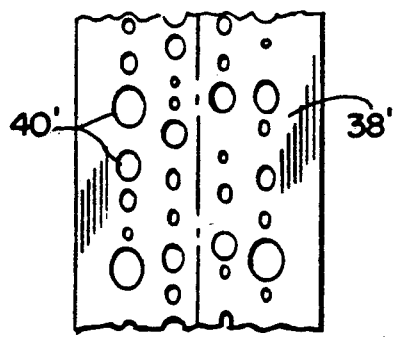
FIG. 11
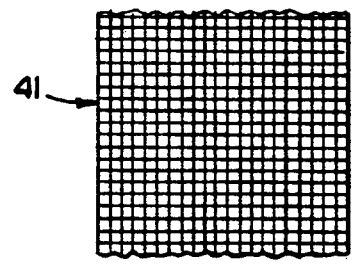
FIG. 12
FIG. 10

APPARATUS FOR DISPENSING MOIST POWDER MATERIALS

BACKGROUND OF THE INVENTION

This invention relates generally to a dispensing apparatus for dispensing and distributing moist, pre-sized powder-like materials that tend to agglomerate and adhere together onto articles or products passing on a conveyor beneath the dispensing apparatus.

Heretofore, various types of machines have been developed for dispensing not only substantially dry flowable materials, but also for dispensing and distributing moist, self-adhering and compactable materials. Examples of dry dispensing machines are disclosed in U.S. Pat. Nos. 3,070,264 and 3,788,529. An example of a moist dispensing machine is disclosed in U.S. Pat. No. 4,595,128. All of these patents are owned by the same assignee as the present application.

Machines for dispensing dry materials are unreliable in dispensing moist or agglomerating materials because the moist materials tend to clog the machine hoppers. Additionally, the dispensing rolls within the machines tend to form a hollowed area in the material which prevents it from being picked up by the dispensing rolls.

Although stripping brushes have been used in such machines, as is disclosed in both the '264 and '529 patents, the brushes do not aid in displacing material in the hopper toward a dispenser roll.

U.S. Pat. No. 4,498,635, also assigned to the same assignee as the present application, discloses a machine for dispensing both dry and moist materials. However, because of the manner in which the material is separated by the grid plates of such machine, it is not possible to precisely control dispensing action.

U.S. Pat. No. 4,595,128 discloses a machine that utilizes not only brushes, but also a particularly configured dispenser roll which is sometimes difficult to clean and is relatively expensive to manufacture. This machine is used for dispensing materials of a substantially large nugget size, such as streusel topping, which may have a percentage of fines and larger nuggets as well as other particles varying between these sizes.

SUMMARY OF THE INVENTION

It is a principal object of this invention to provide a relatively simple, inexpensive dispensing apparatus for depositing moist, pre-sized powder-like materials that tend to agglomerate or are cohesive onto articles or products passing on a conveyor beneath the dispensing apparatus.

In accordance with one aspect of the invention, an elongate hopper which receives the material to be dispensed has a flexible bottom containing a series of holes through which the material is discharged.

Further in accordance with the invention, there is only one rotating component inside the hopper, thus making the dispenser less expensive to manufacture and easier to clean. The rotating component comprises an agitator bar aligned along the length of the bottom of the hopper. The bar itself includes a plurality of circumferentially spaced rods which agitate and deliver material contained within the hopper to the bottom part of the machine for discharge through the holes in the hopper bottom.

In accordance with another aspect of the invention, the hopper bottom comprises a flexible plate or screen that is slung between the lower edges of the long sides of the hopper. The hopper bottom is generally cup or U-shaped in transverse cross-section, and the agitator bar rotates in the bottom of the cup with some tension between the rods and hopper bottom to give a flexing action to the bottom and holes therein as each of the rods is rotated into and out of contact with the bottom which forces material contained in the hopper out through the holes. Also, the material contained within the hopper is captivated by the outside circumference of the rods and the inner portion of the trough-like hopper bottom to create a forced deposit of material out through the holes as successive rods sweep over the holes upon rotation of the agitator bar.

In accordance with yet another aspect of the invention, the dispenser apparatus is easily assembled by placing the agitator bar in the hopper and inserting a stabilizer shaft into a bearing in one end of the hopper, passing the shaft through the end bearings of the agitator bar and then through a second bearing at the other end of the hopper and into a motor driven coupling. To disassemble the dispenser apparatus is just as easily accomplished simply by reversing the assembly procedure.

To the accomplishment of the foregoing and related ends, the invention, then, comprises the features hereinafter described and particularly pointed out in the claims. The following description and the annexed drawings set forth in detail certain illustrative embodiments of the invention, these being indicative, however, of only some of the various ways in which the principles of the invention may be employed.

BRIEF DESCRIPTION OF THE DRAWINGS

In the annexed drawings:

FIG. 3 is a fragmentary top plan view of the dispenser of FIG. 1;

FIG. 4 is a fragmentary end elevation view of the dispenser, partially broken away to show the agitator bar and interior of the hopper;

FIG. 5 is an enlarged fragmentary end view of a portion of the dispenser shown in FIG. 4;

FIG. 6 is a fragmentary enlarged perspective view of the agitator bar and dispenser hopper bottom;

FIGS. 7 and 7a are enlarged cross-sectional views showing the agitator bar in two different positions of rotation and demonstrating the flexing of the hopper bottom;

FIG. 8 is a fragmentary enlarged perspective end view of the mounting for the agitator bar in one side of the hopper;

FIG. 9 is a fragmentary perspective view of the mounting for the agitator bar at the end thereof opposite that shown in FIG. 8;

FIG. 10 is an enlarged fragmentary bottom view of a modified form of dispenser in accordance with this invention which includes fingers underlying the apertured bottom of the dispenser;

FIG. 11 is a fragmentary view of the flexible bottom of the dispenser hopper showing an alternative pattern of apertures; and FIG. 12 is a fragmentary view of another type of flexible bottom for the dispenser hopper of the present invention.

DESCRIPTION OF THE PREFERRED EMBODIMENTS

Figure 1:
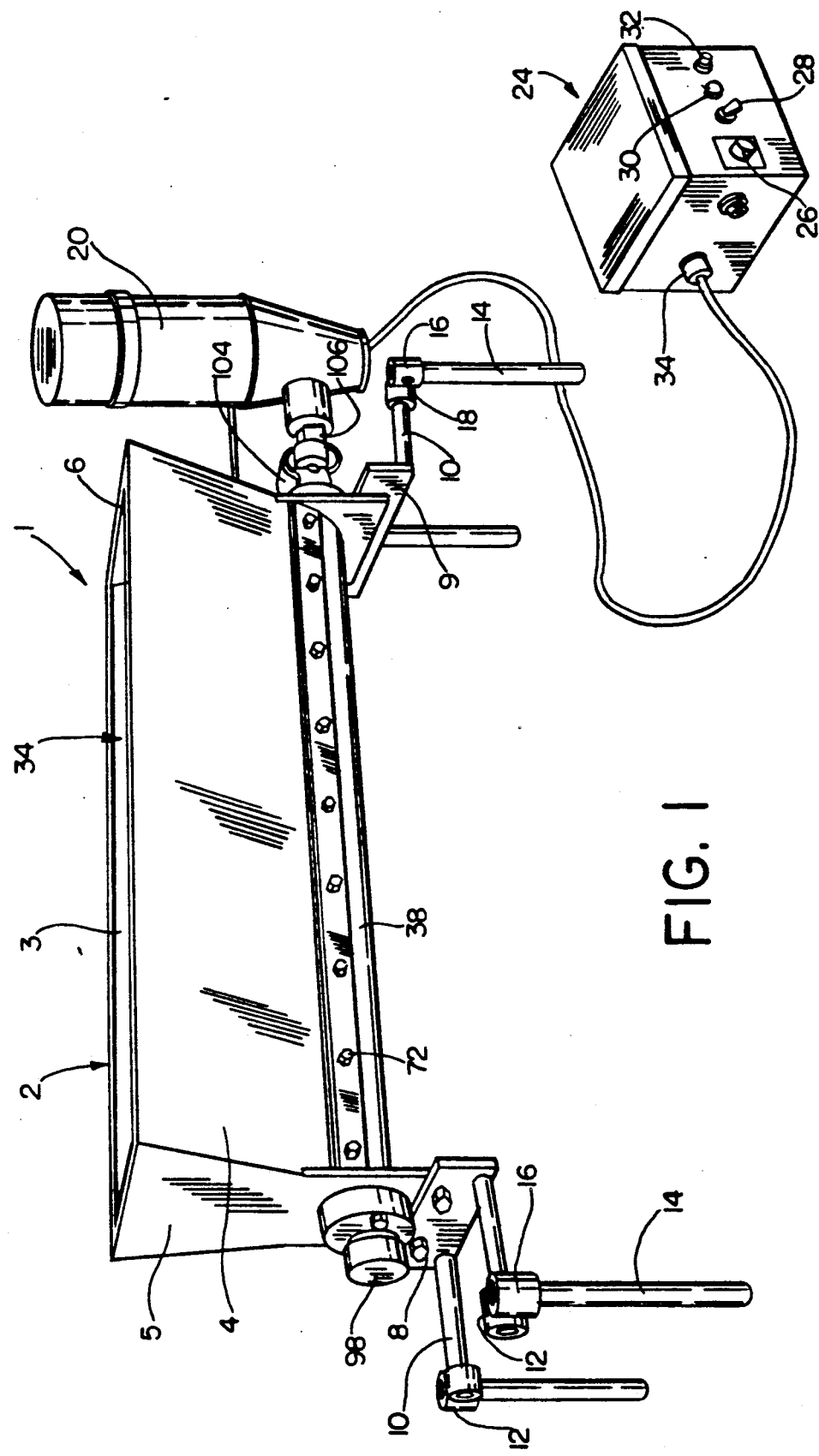
FIG. 1 is a perspective view of a dispensing apparatus in accordance with this invention and includes a showing of a control box for use with the dispenser.

Referring now in detail to the drawings and initially to FIG. 1, a preferred form of material dispensing apparatus 1 is shown. Such apparatus is particularly adapted to handle and dispense moist, pre-sized powder-like materials that tend to agglomerate or adhere together, such as Parmesan cheese or flour. The machine is designed to separate such materials for deposit onto or coating of a product which is moved under the machine on a conveyor belt or the like, not shown.

Figure 2:
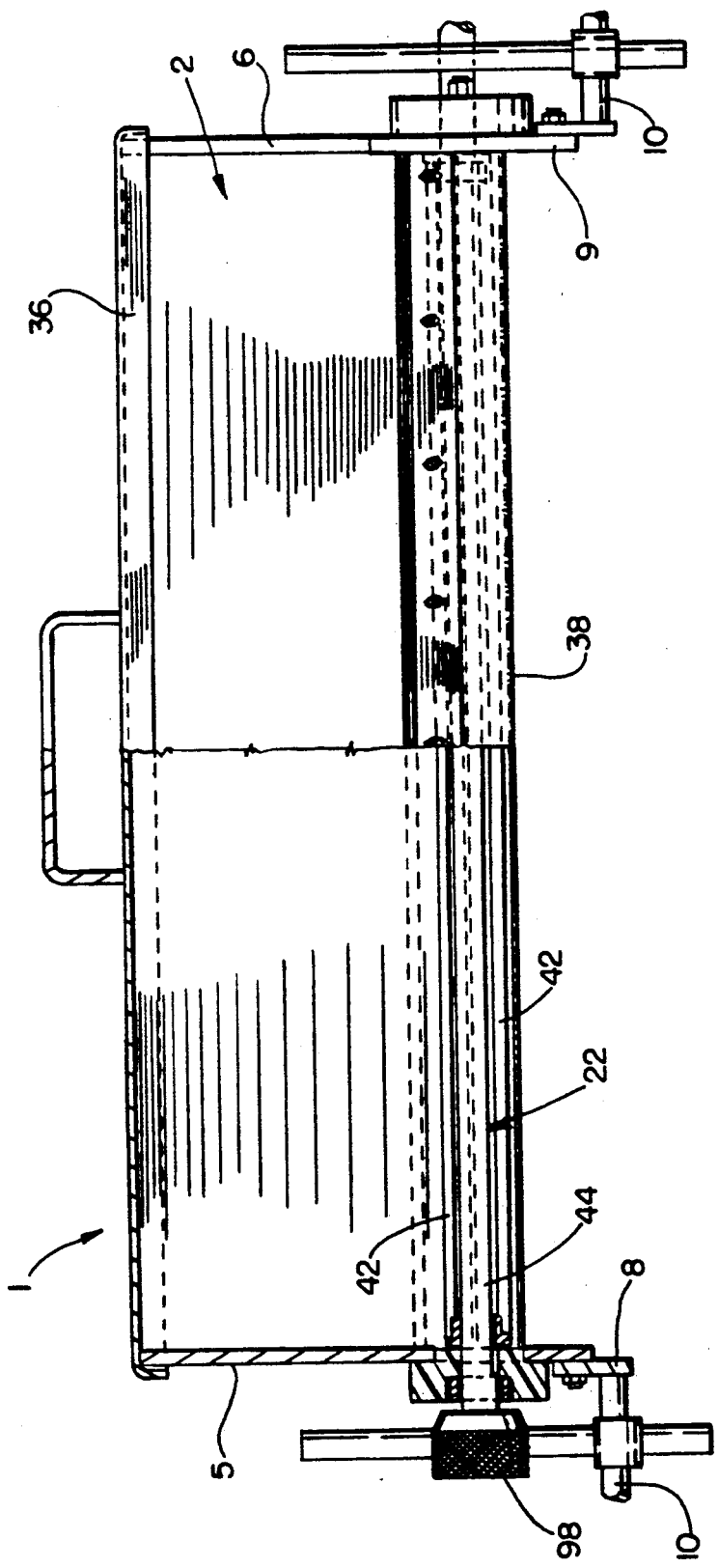
FIG. 2 is a fragmentary front elevation view of the dispensing apparatus of FIG. 1.

With reference both to FIGS. 1 and 2, the dispenser 1 includes a hopper 2 having spaced apart, downwardly converging side walls 3 and 4 which are closed at their ends by a pair of end walls 5 and 6. The end walls are supported respectively by support plates 8 and 9 which in turn are supported by horizontal arms 10. The horizontal arms 10 are slidably received in sleeves 12 from which depend vertical support legs 14, whereby the vertical legs 14 may be slid inwardly and outwardly relative to the end plates 8 and 9 for adjustment of the hopper over conveyor belts of different widths (not shown).

The vertical legs 14 are also desirably slidably received in sleeves 16 suitably attached to the sleeves 12, whereby the hopper 2 itself may thus be moved vertically with respect to the legs 14 to adjust the height of the hopper over the conveyor belt. The sleeves 12 and 16 are designed to be provided with set screws 18 (one of which is schematically shown in FIG. 1) so that the vertical and horizontal adjustment may be locked. The dispenser 1 is designed to be easily placed over a variety of differently configured conveyor belts or product upon which it is desired to dispense the material contained within the hopper.

In FIG. 1, a motor 20 is shown mounted for rotational driving engagement with an agitator bar 22 (see FIG. 2) within the hopper 2. Because the dispenser 1 generally handles sticky, moist, compacting materials, requiring frequent washing, a wash-down motor 20 is desirably used such as a Bodine right angled variable speed permanent magnet motor having, for example, a 10 to 1 gear ratio, with a boot over the top to keep moisture out of the motor area. The motor 20 is operated through a control box 24 which may include a rheostat for controlling the rpm of the motor by adjusting knob 26. Also included is an on/off switch 28, a pilot light 30, and a readily accessible fuse 32. A quick disconnect 34 may also be provided for easily changing motors or controls.

The material to be dispensed is loaded into the hopper 2 at its top 34. A lid 36 may be provided for placement over the top of the hopper as schematically shown in FIG. 2. The hopper 2 includes a flexible bottom 38 made, for example, out of a suitable plastic material such as a fluorocarbon resin of the type sold by DuPont under the trademark TEFLON and, as readily seen in FIGS. 3, 6, 7, 7a and 10, includes a series of apertures 40 through which the material in the hopper is to be discharged. The hopper bottom 38 is generally trough-like or cup-shaped. Also, a single row of aligned holes or apertures 40, which may for example be approximately $\frac{1}{8}$" in diameter on 3/16" centers, are shown extending across substantially the entire bottom length of the hopper.

In one embodiment of the invention, where the hopper bottom 38 is made of a TEFLON plate having a thickness of approximately 0.062", and it is desired to have a 22" wide deposit of material, it is preferable to make the hopper approximately 23" long so that approximately $\frac{1}{2}$" can be left at both ends of the TEFLON plate 38 without any holes 40. If holes were provided too close to the ends of the hopper, they would stretch more than the holes toward the middle of the hopper due to the fact that the downwardly converging hopper side walls 3, 4 are more rigid at their ends and will not give as much as they do in the middle.

Alternatively, as schematically shown in FIG. 11, the number of rows of holes 40' in the plate 38' and the number and size of holes 40' in each row may be varied to provide different material dispensing patterns. This is true also of the length of the hopper as will be apparent.

Moreover, a stainless steel or other type screen 41 such as schematically shown in FIG. 12, could be used in place of a TEFLON plate 38 or 38'. A wide range of screen mesh sizes could be used for such a screen 41, for example, from 20 mesh screen to 200 mesh screens. A screen will cause more of a sifting effect and will produce a heaver deposit of larger particles than a TEFLON plate.

With reference to FIGS. 6-9, a stabilizer shaft 44 is used for driving the agitator bar 22. As seen in FIGS. 7 and 8, studs 45 on each end of the agitator bar 22 engage flats 46 on the stabilizer shaft 44 to cause the agitator bar to be driven by the shaft without the need for any fasteners.

As seen in FIGS. 8 and 9, the stabilizer shaft 44 is journaled in bearings 50 and 52 which are contained in the hopper end walls 5 and 6. Agitator bar 22 comprises a plurality of circumferentially spaced, longitudinally extending rods 42 supported on stabilizer shaft 44 as by end bearings 60. The shaft 44 and rods 42 rotate as a unit about a common axis of rotation through the shaft.

As best seen in FIGS. 7 and 7a, the agitator bar 22 is sized so that as the agitator bar rotates, the flexible apertured bottom 38 (or 38' or 41) of the hopper will be successively engaged and flexed by the agitator rods 42 causing the hopper bottom to move both up and down and from side to side. The alternating flexing and relaxing of the hopper bottom 38 causes the apertures 40 (or screen openings) to deform thereby facilitating the discharge of the material contained within the hopper through the apertures.

In one embodiment of the invention, the agitator or beater bar 22 may have an outside dimension of approximately $\frac{1}{8}$", i.e. an outside diameter of 1-$\frac{1}{8}$", producing an interference of about 1/32" with the hopper bottom 38 to cause the hopper bottom to flex approximately 1/32" during turning of the agitator bar. This flexing keeps the holes 40 from clogging and vibrates the material within the hopper. At the same time the agitator bar 22 drives the material within the hopper 2 out through the holes 40 in the bottom of the hopper.

Since it may be desirable to dispense a different material dispensing pattern, different TEFLON or other flexible plates or stainless steel screens having different hole patterns, as illustrated for example in FIGS. 11 and 12, may be used for the hopper bottom.

For ease of changing of the hopper bottom, it may be desirable to use clamps 80 shown in FIG. 10 to hold the bottom in place instead of the nuts 72 shown in FIGS. 1 and 7. This is accomplished as by providing holes along the edges of the hopper bottom 38 for insertion over studs 82 along the bottom 84 of the hopper exterior side walls 3, 4. Metal blades 86 may then be placed over the studs 82, and either secured by the nuts 72, previously mentioned, or by for example three such clamps 80 on each side of the hopper which apply pressure to the blades 86 to clamp the edges of the hopper bottom to the outside of the hopper side walls.

By making the hopper bottom 38, 38', or 41 readily changeable, one may provide a series of aperture patterns as aforementioned. For instance, up to six rows can be provided in a TEFLON plate, with the same of different hole sizes, number of holes and hole spacing in each row depending on the desired dispensing effect.

The dispenser 1 of the present invention was primarily designed to deposit topping such as Parmesan cheese on a bread product. However, such a dispenser can also be used to dispense flour and other powder-like materials as well.

If the hopper bottom consists of a TEFLON plate 38, the beater rods 42 are desirably made of metal, whereas if some type of metal screening 41 is used for the hopper bottom, the beater rods 42 are desirably made of a relatively hard plastic material such as acetate resin of the type sold by DuPont under the trademark DELRIN. In either event the output of material still depends in part on the flexing of the hopper bottom to force the material out through the bottom openings 40. As previously noted, a bottom screen will cause more of a sifting effect and may produce a heavier deposit of larger particles than a TEFLON plate. Also, a bottom screen is capable of breaking down lumpier materials than a TEFLON plate.

With further reference to FIGS. 7 and 7a, it can be appreciated that the beater rods 42 will captivate material in the vortex of the hopper 2 and carry the material into engagement with the flexible bottom 38, thereby flexing the bottom as the beater rods draw material across the bottom openings 40 to force the material through the openings. As the agitator bar 22 and inclusive beater rods 42 rotate generally in a direction shown by the arrow A in FIG. 7a, the initial shock of each rod engaging the flexible hopper bottom 38 gives the bottom an up-and-down motion as well as a side-to-side motion to flex the holes 40 and keep them from clogging. In a preferred embodiment, four beater rods 42 each approximately 3/16" in diameter are supported by a ½" diameter stabilizer shaft 44. However, it should be appreciated that fewer or more beater rods may be carried for rotation with the stabilizer shaft if desired.

The dispenser 1 shown in FIG. 10 is provided with a plurality of fingers 90 downstream of the apertured bottom 38. The fingers 90 are independently movable to underlie at least a portion of the apertures 40 to vary the effective aperture size. These fingers are shown as being slidable between a pair of support bars 92 and are provided with descending grasping elements 94 and stop studs 96 which prevent complete withdrawal of the figners as they are adjusted relative to the bottom openings 40 of the hopper 2. The finger width, i.e., in the long dimension of the hopper, can be varied to underlie preferably between two and four holes. In a preferred embodiment, the finger width is about ¼" to cover several holes each approximately ⅛" in diameter on 3/16" centers.

In order to thoroughly clean the dispenser 1, it is necessary to disassemble the dispenser. This is easily accomplished in accordance with the present invention, it only being necessary to withdraw the stabilizer shaft 44 from the agitator bar 22 by grasping knurled shaft end 98 and pulling it to the left as seen in FIG. 3. The stabilizer shaft 44 may be readily withdrawn because the fitting 102, shown in FIG. 9, accommodates a slip fit of the shaft into the coupling element 104 which is attached to drive shaft 106 of the motor unit 20. Once the stabilizer shaft 44 is totally withdrawn, the entire agitator bar 22 may be lifted out of the hopper 2 as a unit and all elements may then be cleaned.

Conversely, it will be appreciated that the dispenser 1 is easily assembled by placing the agitator bar 22 in the hopper 2 and inserting the stabilizer shaft 44 into the bearing ring 50 at one end of the hopper and pushing it through the end bearings 60 of the agitator bar 22 and then through the bearing ring 52 at the other end of the hopper and into the motor driven coupling 104.

Although the invention has been shown and described with respect to certain preferred embodiments, it is obvious that equivalent alterations will occur to others skilled in the art upon a reading and understanding of the specification. The present invention includes all such equivalent alterations and is limited only by the scope of the claims.

What is claimed is:

1. A material dispensing apparatus comprising a hopper having a flexible apertured bottom, and agitator bar means mounted for rotation within said hopper into and out of contact with said apertured bottom to cause said apertured bottom to flex such that material contained in said hopper is dispensed through openings in said apertured bottom, said hopper having downwardly converging side walls, and plural studs extending outwardly from said side walls along bottoms of said side walls, said flexible apertured bottom comprising an elongate arcuate member containing said openings, said arcuate member having holes along edges of said arcuate member insertable over said studs, and clamp means on said side walls for releasably clamping said edges of said arcuate member to said side walls for ease of removal and replacement of said arcuate member.

2. The material dispensing apparatus of claim 1 further comprising plate means insertable over said studs outwardly of said edges of said arcuate member, said clamp means being operative to apply pressure to said plate means to clamp said edges of said arcuate member to said side walls.

3. A material dispensing apparatus comprising a hopper having a flexible apertured bottom, and agitator bar means mounted for rotation within said hopper into and out of contact with said apertured bottom to cause said apertured bottom to flex such that material contained in said hopper is dispensed through openings in said apertured bottom, said hopper including downwardly converging side walls, and said agitator bar means comprising a plurality of circumferentially spaced longitudinally extending rods supported on a rotating stabilizer shaft, whereby as said stabilizer shaft rotates, said rods periodically contact said apertured bottom to cause said apertured bottom to flex, said stabilizer shaft being drivingly connected with said agitator bar means, said agitator bar means and said stabilizer shaft being slidable longitudinally with respect to each other and adapted for uniform rotation about a mutual axis of rotation, said hopper further including end plates having bearing means for rotatably supporting said stabilizer shaft, and a motor for imparting rotation to said stabilizer shaft, said motor and said stabilizer shaft being detachably slidably connected by coupling means, said stabilizer shaft extending through said bearing means and said hopper and having a graspable end and an opposite end for detachable connection to said coupling means, said stabilizer shaft being removably captured in said coupling means, the removal of said stabilizer shaft from said agitator bar means and said hopper permitting removal of said agitator bar means from said hopper.

4. An apparatus for dispensing material comprising: an elongate hopper, an interchangeable flexible plastic apertured bottom for said hopper, means for removably attaching said plastic apertured bottom to said hopper, said apertured plastic bottom being replaceable with other apertured plastic bottoms having apertures different in number and size from said apertures of said plastic bottom, and agitator means for forcing material through said apertures, said agitator means being mounted for continuous rotation within said hopper and being aligned generally with said long dimension of said hopper, said agitator means during such rotation engaging said plastic bottom to cause said plastic bottom to flex.

5. The apparatus of claim 4 wherein said agitator means comprises a circumferentially spaced series of longitudinally extending straight round rods rotatable about a common axis, said rods having sides which successively contact said plastic bottom upon rotation of said agitator means to cause said attached one of said plastic bottom to flex.

6. The apparatus of claim 4 wherein there are plurality of rows of said apertures in said plastic bottom.

7. A material dispensing apparatus comprising a hopper having a flexible apertured bottom, and agitator bar means mounted for rotation within said hopper into and out of contact with said apertured bottom to cause said apertured bottom to flex such that material contained in said hopper is dispensed through apertures in said apertured bottom, said agitator bar means comprising a plurality of longitudinally extending straight round rods disposed circumferentially about the axis of rotation of said agitator bar means, said rods being supported by end bearings mounted on a stabilizer shaft for rotation of all of said rods and said stabilizer shaft as a unit, said hopper including end plates having bearing means for rotatably supporting said stabilizer shaft, and said rods having sides which successively contact said apertured bottom upon rotation of said agitator bar means and said stabilizer shaft as a unit to cause said apertured bottom to flex.

8. The apparatus of claim 7 wherein said apertured bottom is made of plastic and the flexing of said apertured bottom changes the effective size of said apertures in said apertured bottom by multi-directional stretching of said apertured bottom.

9. The apparatus of claim 8 wherein said hopper includes downwardly converging side walls and said end plates are disposed at opposite ends of said side walls, said apertures in said apertured bottom extending up to within approximately one-half inch of said end plates.

10. The apparatus of claim 7 further comprising a plurality of finger means independently movable to underlie at least a portion of said apertures in said apertured bottom to vary the effective aperture size.

11. The apparatus of claim 10 wherein each of said finger means is of a width sufficient to underlie a plurality of said apertures in said apertured bottom to vary the effective aperture size.

12. The apparatus of claim 7 wherein there is a single row of aligned apertures in said apertured bottom.

13. The material dispensing apparatus of claim 7 wherein said apertured bottom comprises a flexible membrane which is pressed outwardly in areas contacted by said rods.

14. The material dispensing apparatus of claim 7 wherein said apertured bottom comprises a screen.

15. The material dispensing apparatus of claim 7 wherein said apertured bottom comprises a plastic membrane containing said openings.

16. The material dispensing apparatus of claim 7 wherein said end bearings are drivingly connected to said stabilizer shaft by means allowing longitudinal sliding movement of said stabilizer shaft relative to said end bearings to permit removal of said agitator bar means from said hopper after removal of said stabilizer shaft from said end bearings.

17. The material dispensing apparatus of claim 16 further comprising a motor for imparting rotation to said stabilizer shaft, said motor and said stabilizer shaft being detachably slidably connected by coupling means.

18. The material dispensing apparatus of claim 17 wherein said stabilizer shaft has a graspable end and an opposite end for detachable connection to said coupling means, said stabilizer shaft being removably captured in said coupling means.

* * * * *